(12) United States Patent
Tsai et al.

(10) Patent No.: US 8,079,386 B1
(45) Date of Patent: Dec. 20, 2011

(54) VARIABLE PRESSURE REDUCING DEVICE

(75) Inventors: Wen-Feng Tsai, Kaohsiung County (TW); Ke-Fu Lin, Kaohsiung County (TW)

(73) Assignee: Luchan Enterprises Co., Ltd., Kaohsiung County (TW)

( * ) Notice: Subject to any disclaimer, the term of this patent is extended or adjusted under 35 U.S.C. 154(b) by 0 days.

(21) Appl. No.: 12/860,366

(22) Filed: Aug. 20, 2010

(51) Int. Cl.
  *F15D 1/04* (2006.01)
(52) U.S. Cl. .......... 138/46; 138/45; 138/43; 138/26; 251/126; 251/264; 137/625.38
(58) Field of Classification Search .......... 138/45, 138/46, 43, 26; 251/126, 117, 264; 137/625.37, 137/625.38
  See application file for complete search history.

(56) References Cited

U.S. PATENT DOCUMENTS

| | | | | |
|---|---|---|---|---|
| 1,980,085 A | * | 11/1934 | Perry et al. | 138/43 |
| 2,334,166 A | * | 11/1943 | Allen | 137/315.02 |
| 2,517,154 A | * | 8/1950 | Wolf | 138/43 |
| 2,532,452 A | * | 12/1950 | Hoesel | 138/45 |
| 2,824,573 A | * | 2/1958 | Mason et al. | 137/505.13 |
| 2,925,243 A | * | 2/1960 | Griswold | 251/117 |
| 3,091,213 A | * | 5/1963 | Maskell et al. | 116/70 |
| 3,143,145 A | * | 8/1964 | Kauss | 138/43 |
| 3,390,702 A | * | 7/1968 | Gilmont | 138/45 |
| 3,841,354 A | * | 10/1974 | McDonnell | 138/43 |
| 4,067,361 A | * | 1/1978 | Hollister et al. | 138/42 |
| 4,383,552 A | * | 5/1983 | Baker | 138/46 |

FOREIGN PATENT DOCUMENTS

JP      2003106951 A  *  4/2003

* cited by examiner

*Primary Examiner* — Patrick F Brinson
(74) *Attorney, Agent, or Firm* — Kirton & McConkie; Evan R. Witt (57) ABSTRACT

A variable pressure reducing device includes a hollow housing body formed with an inlet opening, an outlet opening spaced apart from the inlet opening, and an inner wall surface. The variable pressure reducing device further includes an intake tube that extends into the housing body from the inlet opening. The intake tube is formed with an inlet channel and is further formed with an outer tube surface that cooperates with the inner wall surface to form an outlet channel in fluid communication with the outlet opening. The variable pressure reducing device also includes a redirection structure movably mounted in the housing body and movable relative to the intake tube between a redirecting state and a sealing state.

8 Claims, 9 Drawing Sheets

VARIABLE PRESSURE REDUCING DEVICE

BACKGROUND OF THE INVENTION

1. Field of the Invention

The invention relates to pressure reduction, and more particularly to a variable pressure reducing device.

2. Description of the Related Art

Figure 1:
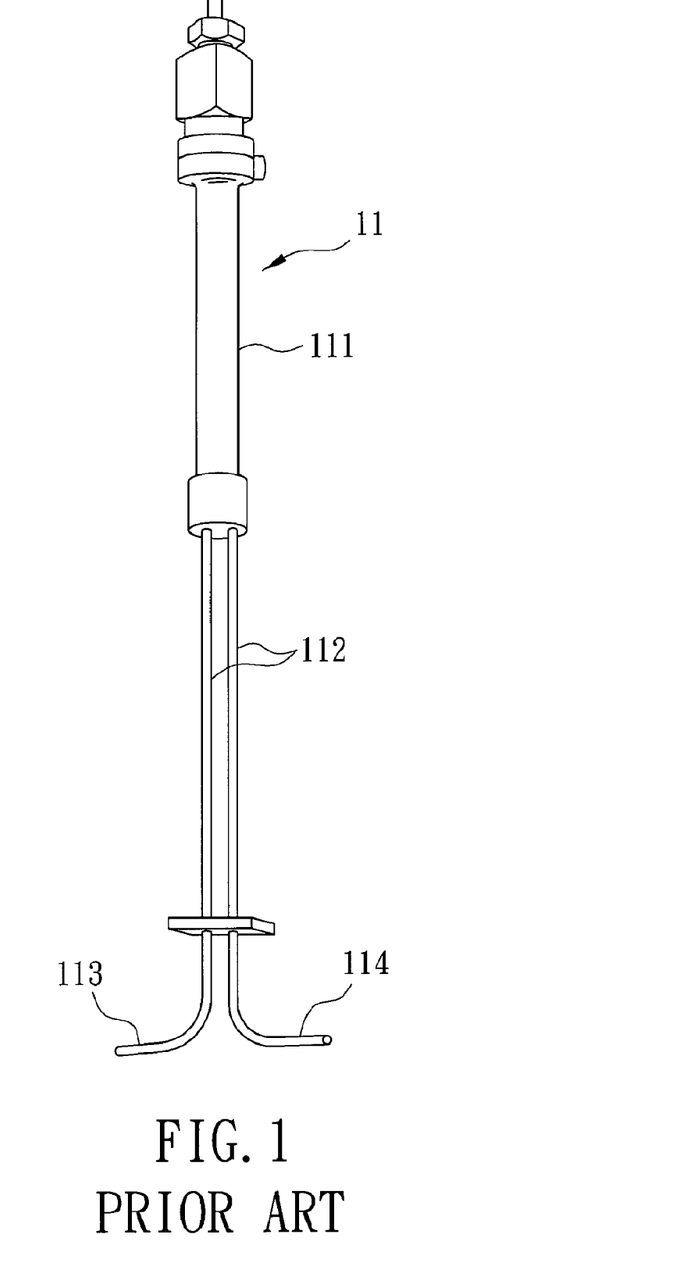
FIG. 1 is a perspective view of a conventional pressure reducing device.

Numerous applications of high pressure fluid systems require, at some point in the system, pressure reduction to allow safe handling of fluids. Referring to FIG. 1, U.S. Pat. RE37,153E discloses a conventional pressure reducing device that includes a housing 11. The housing 11 includes a barrel 111 and a pair of tubes 112 that are each connected to and in fluid communication with the barrel 111. One of the tubes 112 has an inlet 113 and the other one of the tubes 112 has an outlet 114. The inlet 113 is adapted to be connected to a high-pressure liquid containing device (not shown).

Figure 2:
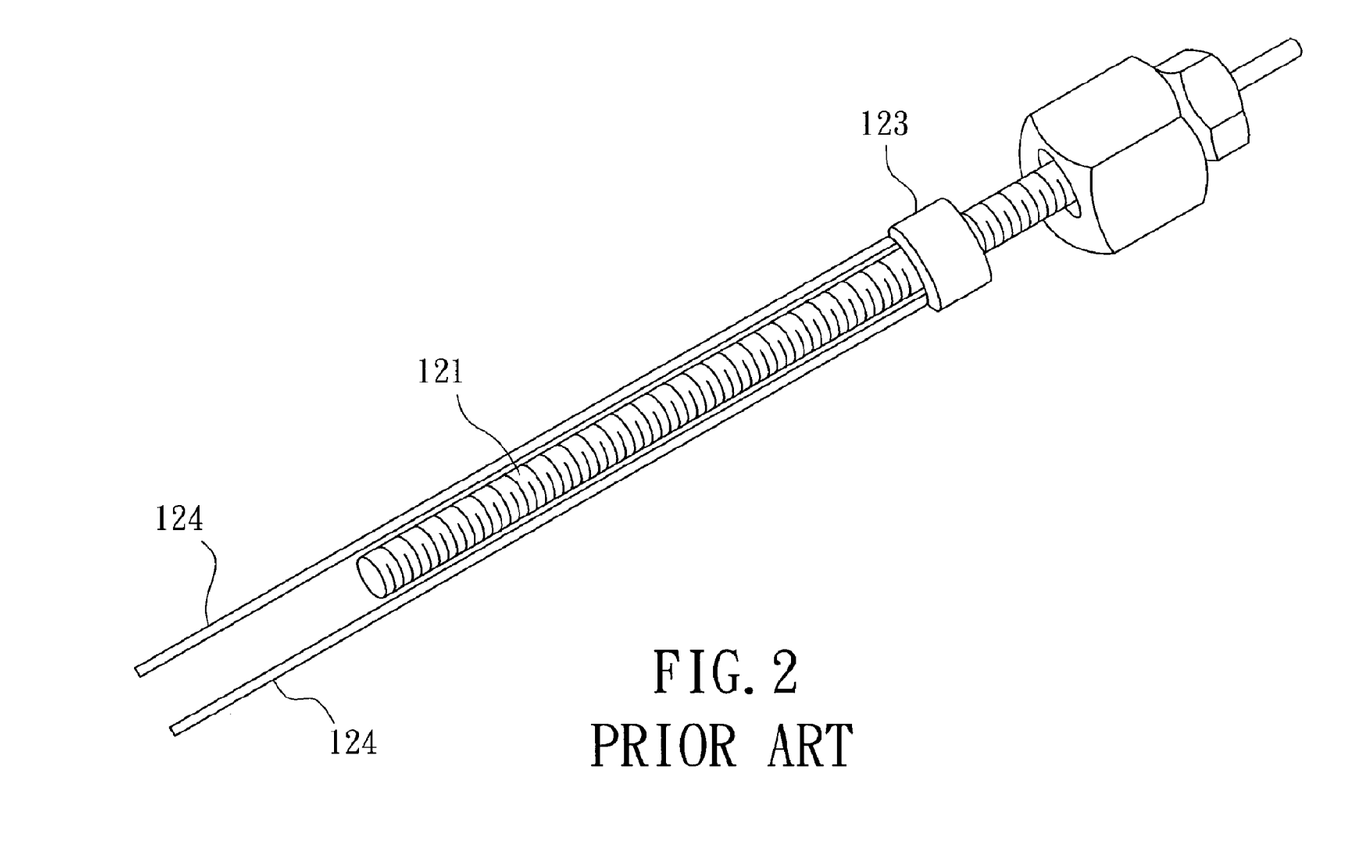
FIG. 2 is a perspective view of a threaded rod and other components of the conventional pressure reducing device.
Figure 3:
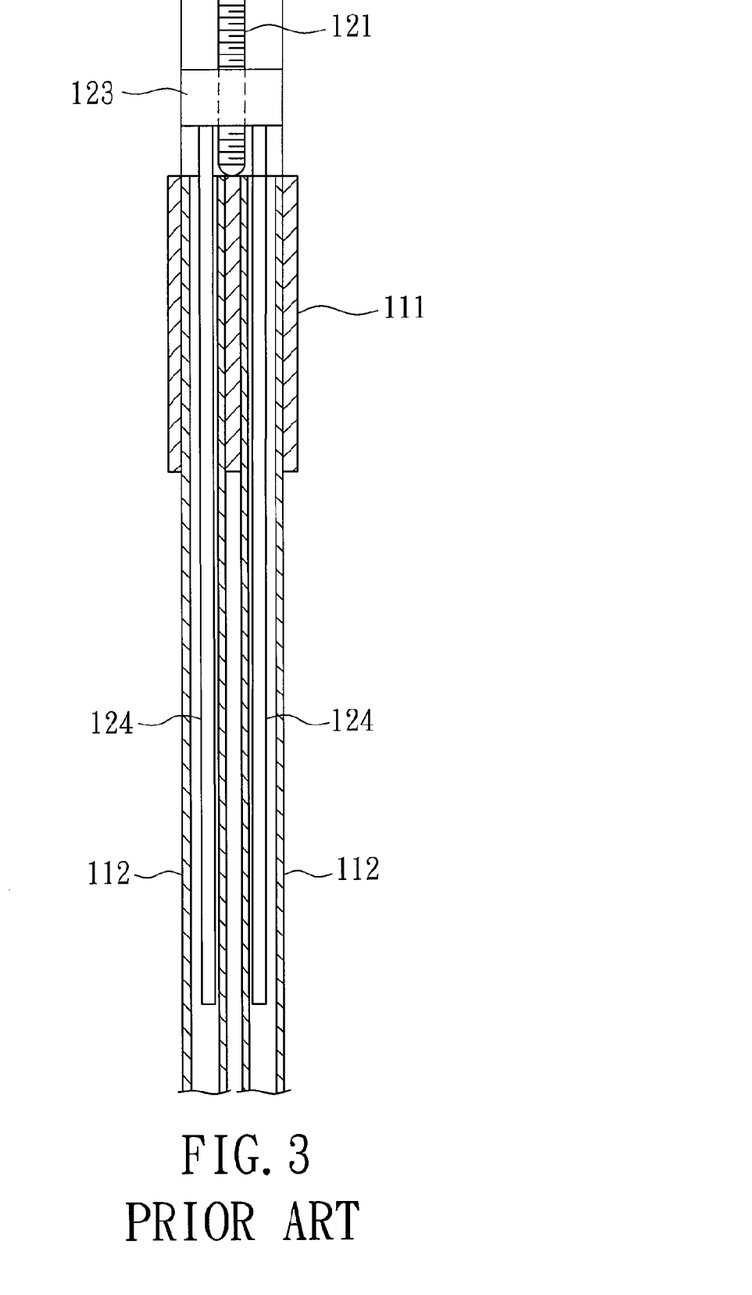
FIG. 3 is an enlarged fragmentary partly sectional view of the conventional variable pressure reducing device.

Referring to FIGS. 1 and 2, the conventional pressure reducing device includes a guide screw 121, a threaded ring 123 mounted threadedly to the guide screw 121, and a pair of rods 124 each connected to the threaded ring 123. With further reference to FIG. 3, the guide screw 121 and the threaded ring 123 are extended in the barrel 111, and each of the rods 124 is extended into a corresponding one of the tubes 112.

The foregoing conventional pressure reducing device includes the following disadvantages:

1) One or both of the rods 124 may abut against an inner surface of the corresponding tube 112 to hinder rotation of the threaded ring 123. The rods 124 may therefore experience substantial and repeated bending stress during operation of the conventional pressure reducing device, which may lead to damage and eventual failure of the device.

2) The spaces between the threaded ring 123 and either the inner wall of the barrel 111 or the guide screw 121 may be continually exposed to high pressure fluid from the inlet 113. This may allow leakage between the threaded ring 123 and either the guide screw 121 or the inner wall of the barrel 111.

3) The barrel 111 and the tubes 112 may be difficult to access and clean, leading to accumulation of dust or blockages that may reduce the effectiveness of the conventional pressure reducing device. If the blockages are severe, the entire device may need to be replaced, adding unnecessarily to operating costs of the system.

SUMMARY OF THE INVENTION

An object of the present invention is to provide a variable pressure reducing device that has a relatively simple structure and a reliable pressure reducing effect.

According to the present invention, a variable pressure reducing device includes a hollow housing body formed with an inlet opening, an outlet opening spaced apart from the inlet opening, and an inner wall surface. The variable pressure reducing device further includes an intake tube that extends into the housing body from the inlet opening. The intake tube is formed with an inlet channel and is further formed with an outer tube surface that cooperates with the inner wall surface to form an outlet channel in fluid communication with the outlet opening. The variable pressure reducing device also includes a control unit.

The control unit includes a redirection structure movably mounted in the housing body and movable relative to the intake tube between a redirecting state and a sealing state. At the redirecting state, the redirection structure cooperates with the intake tube to form a redirection channel that permits fluid flow between the inlet channel and the outlet channel. At the sealing state, the redirection structure blocks fluid flow between the inlet channel and the outlet channel. The control unit further includes a drive unit coupled to and operable to drive movement of the redirection structure between the redirecting state and the sealing state.

The redirection structure includes a sealing part, a sleeve tube extending from the sealing part, and an elongated member extending from the sealing part and disposed in the sleeve tube. The intake tube extends into the sleeve tube, and the elongated member extends into the intake tube. The redirection channel is formed by an outer surface of the elongated member, an inner tube surface of the intake tube, the outer tube surface of the intake tube, and an inner sleeve surface of the sleeve tube. The sealing part, the sleeve tube, and the elongated member are movable relative to the intake tube to vary configuration of the redirection channel according to a depth of extension of the intake tube into a space between the sleeve tube and the elongated member.

An advantage of the present invention includes the sealing part, which reduces back flow from the intake tube caused by high pressure liquid that leaks between the sleeve tube and the elongated member. In addition, the structure is simplified with respect to the conventional pressure reducing device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
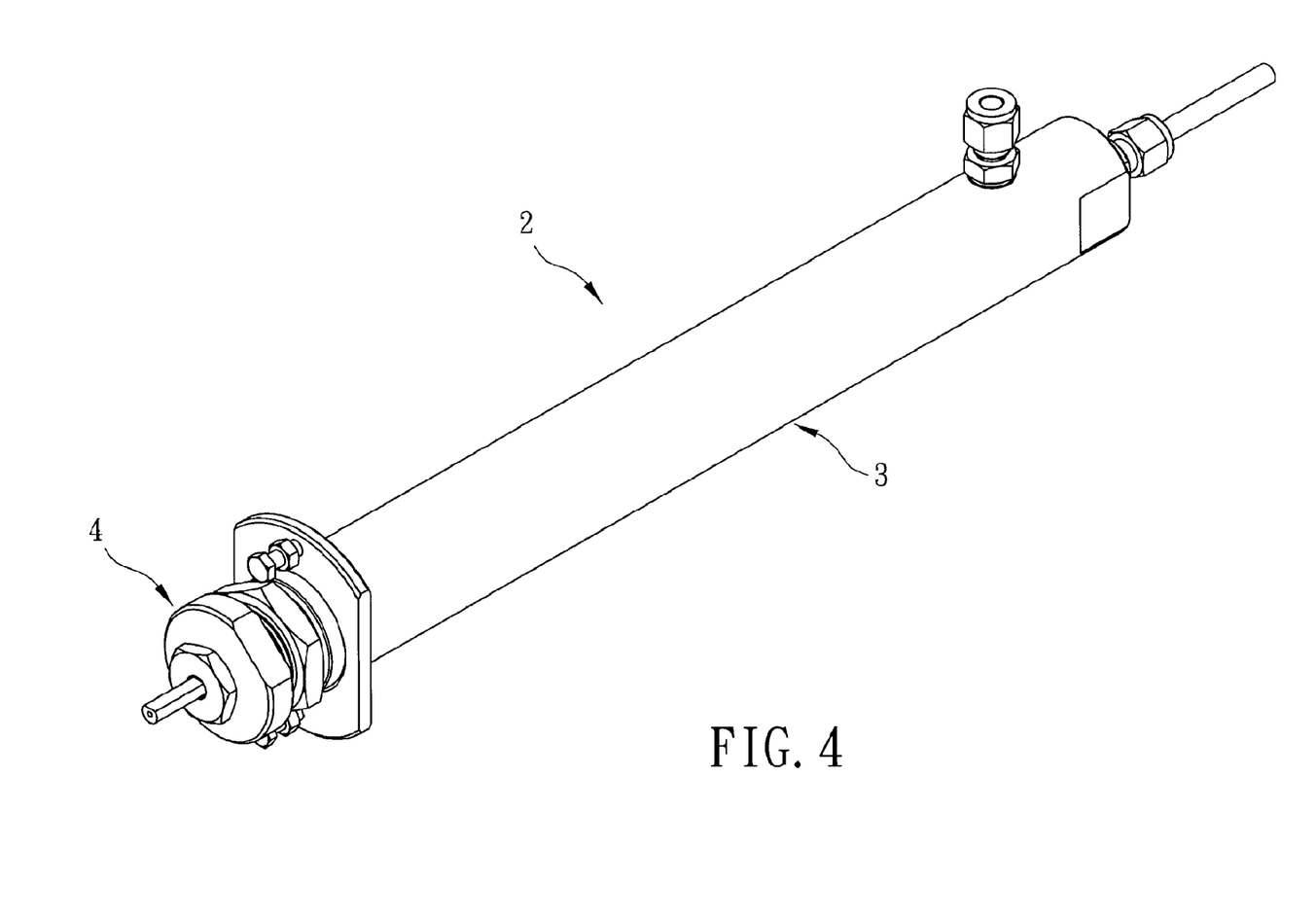
FIG. 4 is a perspective view of the preferred embodiment of a variable pressure reducing device according to the present invention.

Referring to FIG. 4, the preferred embodiment of a variable pressure reducing device 2 according to the present invention is shown to be adapted for reducing pressure of high-pressure liquid before releasing it. The variable pressure reducing device 2 includes a housing 3 and a control unit 4 movable in the housing 3.

Figure 5:
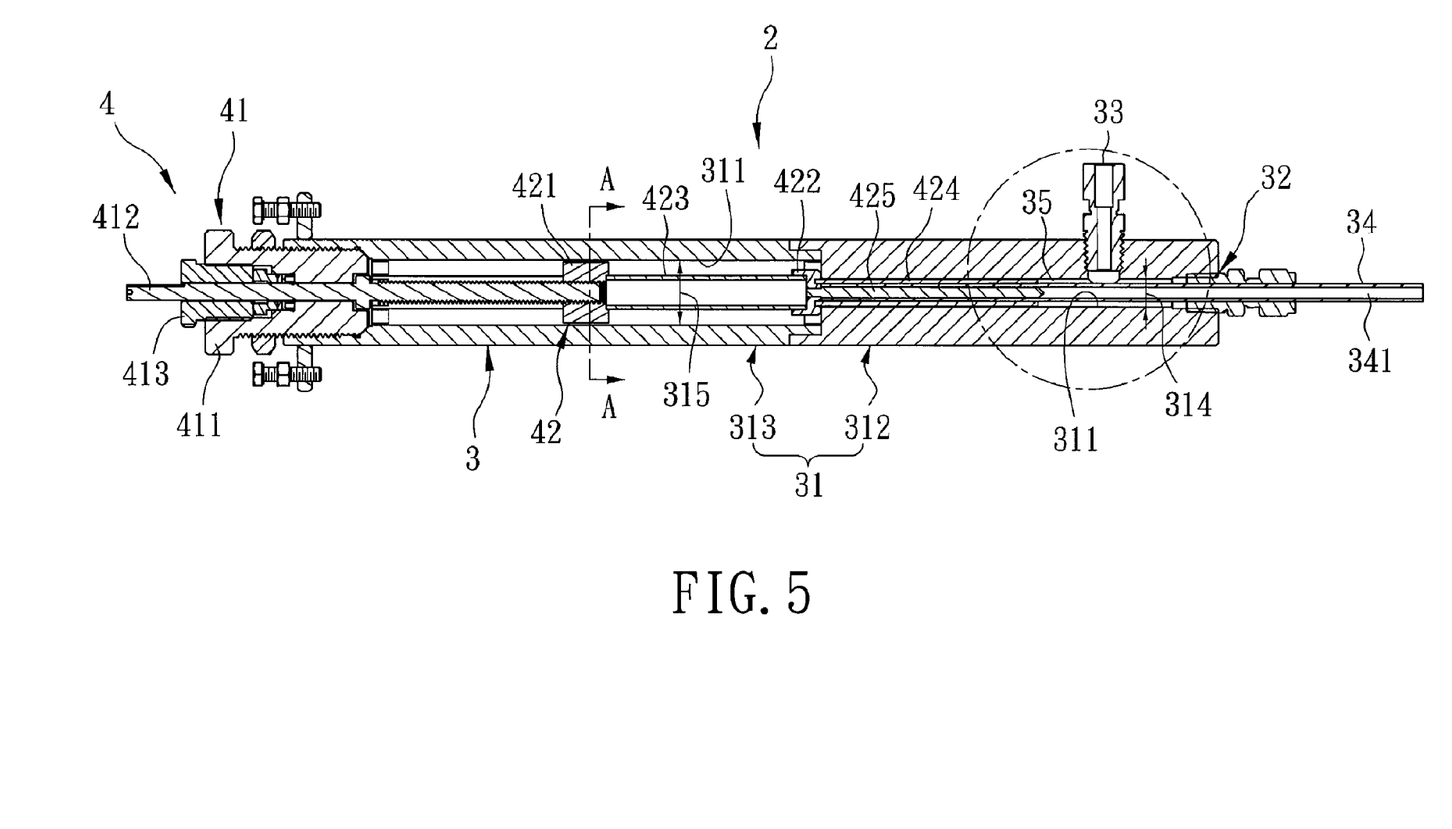
FIG. 5 is a sectional schematic view illustrating the preferred embodiment at a closed state.

Referring to FIG. 5, the housing 3 includes a hollow housing body 31 formed with an inlet opening 32 and an outlet opening 33 spaced apart from the inlet opening 32. The housing 3 further includes an intake tube 34 extending into the housing body 31 from the inlet opening 32. High-pressure liquid flows into the variable pressure reducing device 2 through the intake tube 34.

The housing body 31 has an inner wall surface 311, and includes a first section 312 formed with the inlet opening 32 and the outlet opening 33 and having a first inner diameter 314. The housing body 31 further includes a second section 313 connected to the first section 312 and having a second inner diameter 315 that is larger than the first inner diameter 314 of the first section 312.

Figure 6:
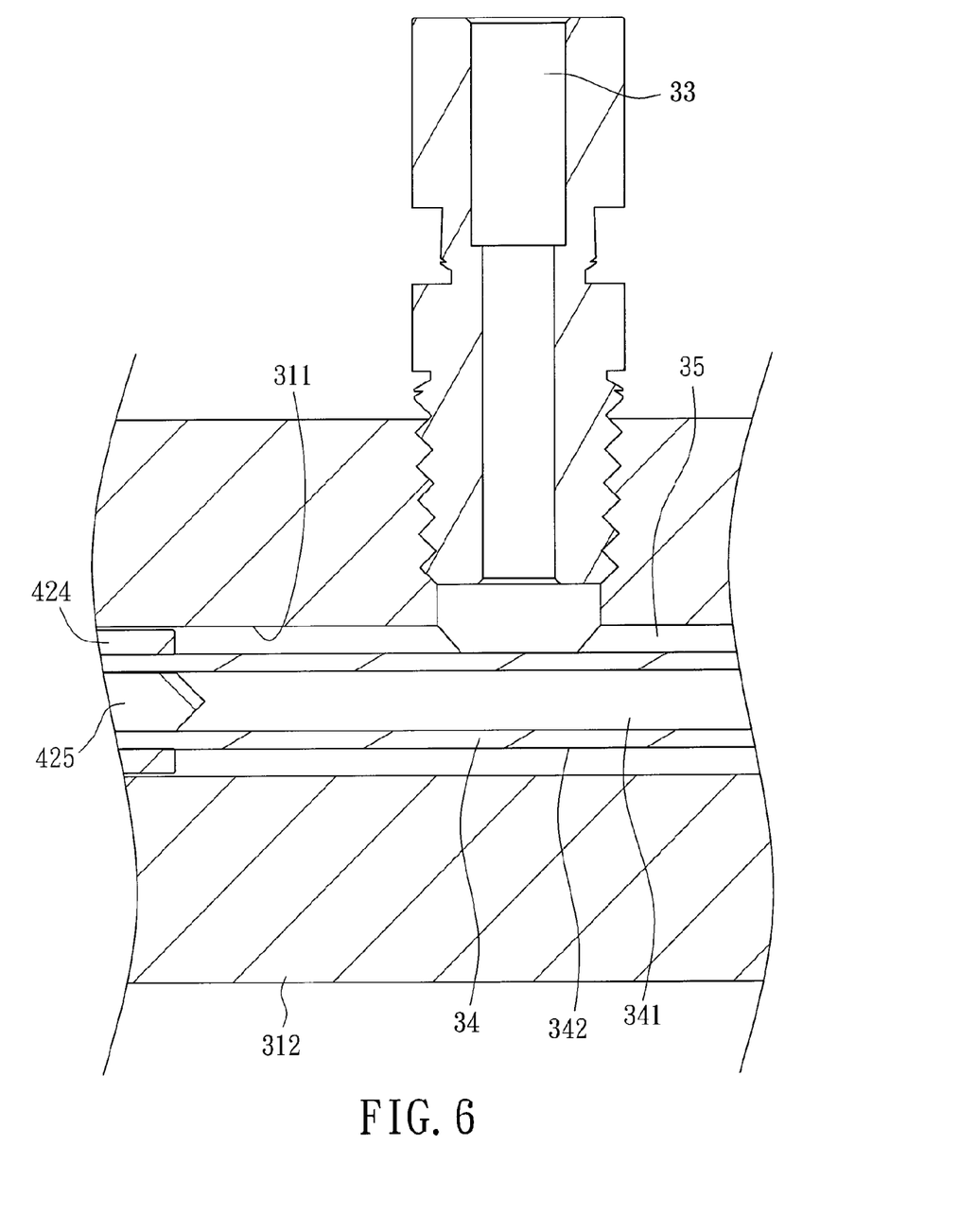
FIG. 6 is an enlarged fragmentary sectional schematic view of the circled area in FIG. 5.

Referring to FIG. 6, which is an enlarged fragmentary sectional schematic view of the circled area in FIG. 5, the intake tube 34 is extended into the first section 312, and is formed with an inlet channel 341 and an outer wall surface 342. The intake tube 34 is spaced apart from the inner wall surface 311, and the outer wall surface 342 of the intake tube 34 cooperates with the inner wall surface 311 to define an outlet channel 35 in fluid communication with the outlet opening 33.

Referring once more to FIG. 5, the control unit 4 includes a drive unit 41 mounted operably on a side of the second section 313 of the housing body 31 opposite to the inlet opening 32. The drive unit 41 includes a sealing cap 411 mounted threadedly on the housing body 31, and a rotary unit 413 mounted rotatably to the housing body 31. The drive unit 41 further includes a threaded shaft 412 mounted co-rotatably to the rotary unit 413 such that the threaded shaft 412 extends into the second section 313 of the housing body 31.

Figure 8:
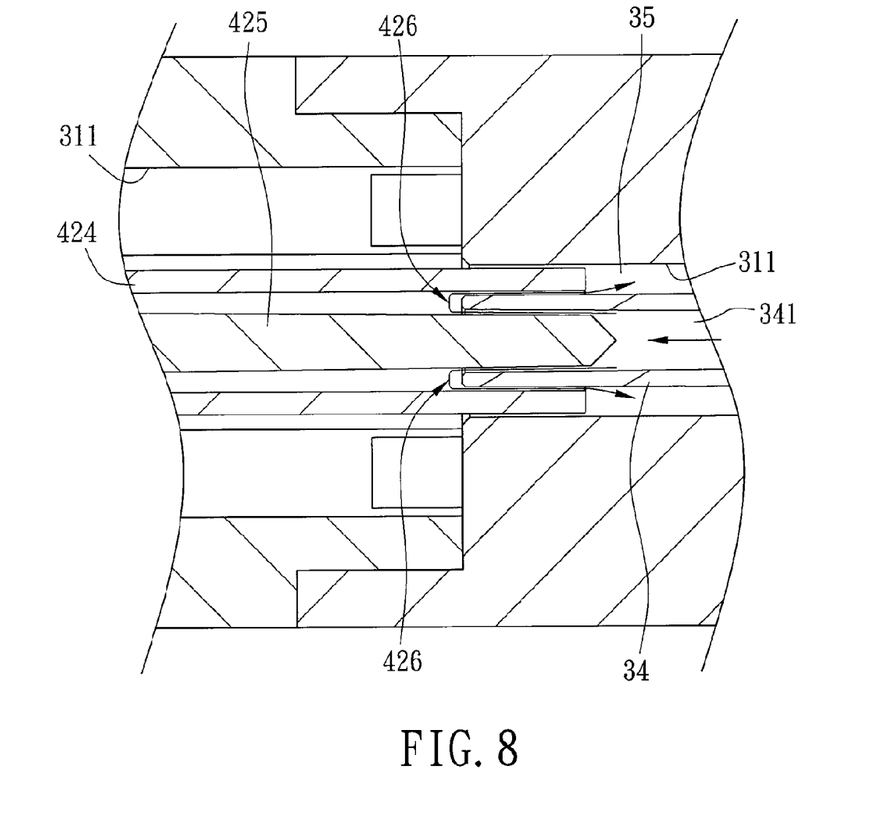
FIG. 8 is an enlarged fragmentary sectional schematic view of the circled area in FIG. 7.

The control unit 4 further includes a redirection structure 42 movably mounted in the housing body 31. The redirection structure 42 is driven by rotational operation of the drive unit 41 to move along an axis relative to the intake tube 34 between a redirecting state and a sealing state. At the redirecting state, the redirection structure 42 cooperates with the intake tube 34 to form a redirection channel 426 that permits fluid flow between the inlet channel 341 and the outlet channel 35, as best shown in FIG. 8. At the sealing state, the redirection structure 42 blocks fluid flow between the inlet channel 341 and the outlet channel 35, as best shown in FIG. 5.

The redirection structure 42 includes a guide part 421 having a polygonal shape and mounted on the threaded shaft 412 of the drive unit 41. The guide part 421 engages slidably and non-rotatably with the inner wall surface 311 of the second section 313 of the housing body 31. The guide part 421 engages threadedly with the threaded shaft 412 such that rotation of the rotary unit 413 relative to the housing body 31 results in co-rotation of the threaded shaft 412 and movement of the guide part 421 along the threaded shaft 412. Rotation of the threaded shaft 412 may be driven by a user's hand, a machine powered belt, or any other appropriate method for causing the threaded shaft 412 to rotate.

The redirection structure 42 further includes a sealing part 422 coupled to and driven to move by the guide part 421. The redirection structure 42 also includes a coupling sleeve 423 that interconnects the guide part 421 and the sealing part 422 and that is sleeved on the threaded shaft 412. The redirection structure 42 also includes a sleeve tube 424 extending from the sealing part 422. The redirection structure 42 further includes an elongated member 425 extending from the sealing part 422 and disposed in the sleeve tube 424.

The intake tube 34 extends into the sleeve tube 424, and the elongated member 425 extends into the intake tube 34. The redirection channel 426 is formed by an outer surface of the elongated member 425, an inner tube surface of the intake tube 34, the outer tube surface of the intake tube 34, and an inner sleeve surface of the sleeve tube 424, as best illustrated in FIG. 8. The sealing part 422, the sleeve tube 424, and the elongated member 425 are movable relative to the intake tube 34 and the outlet channel 35 to vary configuration of the redirection channel 426 according to the depth of extension of the intake tube 34 into a space between the sleeve tube 424 and the elongated member 425. The diameter of the elongated member 425 tapers along a direction from the sealing part 422 to the intake tube 34, and an inner tube surface diameter of the intake tube 34 tapers along a direction away from the sealing part 422.

Figure 9:
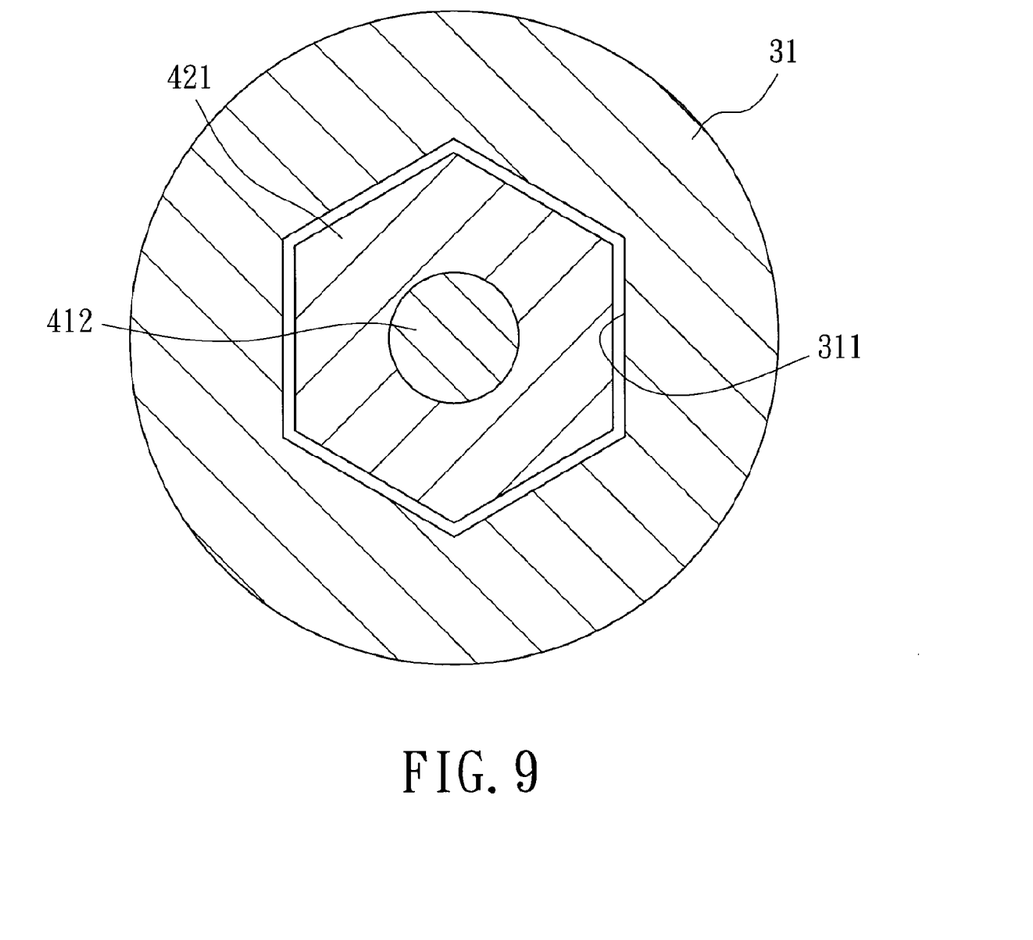
FIG. 9 is a sectional schematic view taken along line A-A in FIG. 5.

As shown in FIG. 9, part of the inner wall surface 311 of the second section 313 of the housing body 31 is formed with a polygonal cross-section that corresponds to the shape of the guide part 421 to allow sliding movement of the guide part 421. In this embodiment, the guide part 421 has a hexagonal shape, and the inner wall surface 311 of the second section of the housing body 31 is also formed with a hexagonal cross-section that corresponds to the guide part 421.

Referring to FIGS. 5 and 6, when the control unit 4 is at the closed state, the sealing part 422 of the redirection structure 42 seals and blocks the first section 312 of the housing body 31. Because of the taper of the elongated member 425 and the inner tube surface diameter of the intake tube 34, at the closed state, an elongated member surface of the elongated member 425 is disposed close to the inner tube surface. A near sealing state is thus formed between the elongated member 425 and the intake tube 34 that prevents the high-pressure liquid from flowing through the intake tube 34.

Figure 7:
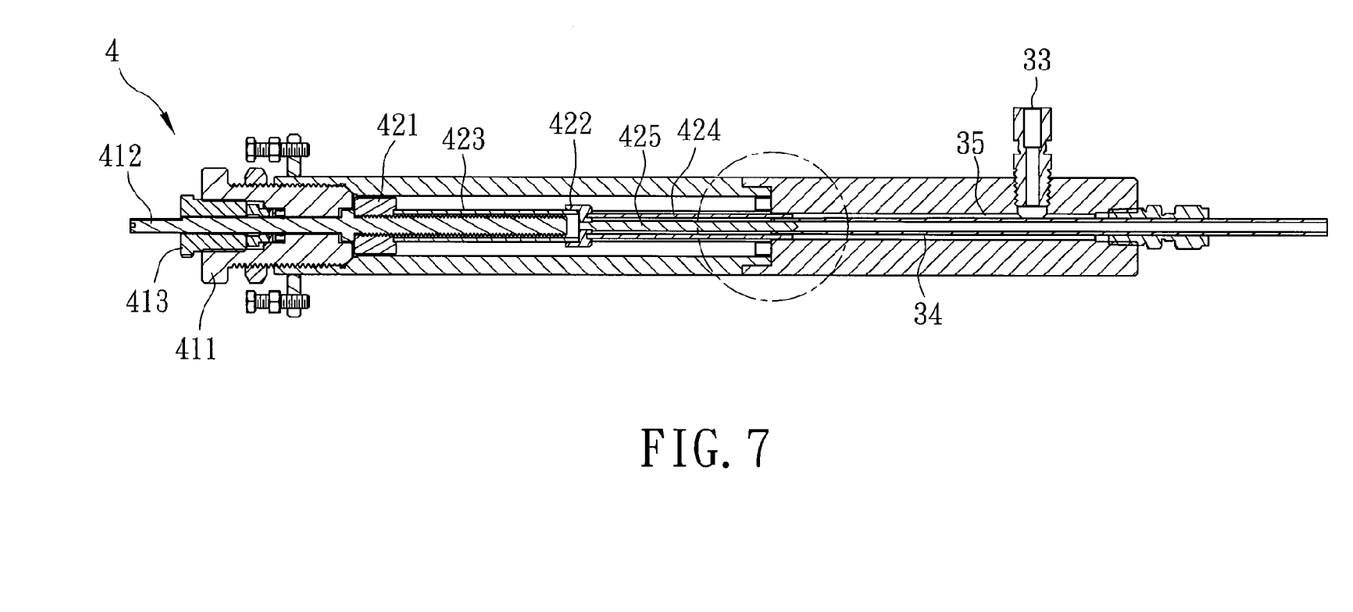
FIG. 7 is a sectional schematic view illustrating the preferred embodiment in an opened state.

Referring to FIG. 7, to open the control unit 4, the rotary unit 413 is rotated to drive rotation of the threaded shaft 412. In this manner, the guide part 421 is driven to move toward the sealing cap 411. Movement of the guide part 421 causes linked movement of the coupling sleeve 423, the sealing part 422, the sleeve tube 424, and the elongated member 425 toward the sealing cap 411. When the guide part 421 reaches and abuts against the sealing cap 411, the maximum opening state is reached.

Referring also to FIG. 8, which is an enlarged fragmentary sectional schematic view of the circled area in FIG. 7, the tapering end of the elongated member 425 is disposed within the intake tube 34 at a location where the inner tube surface diameter is large enough to permit formation of the redirection channel 426 between the elongated member 425 and the intake tube 34. Accordingly, after entering the intake tube 34, the high-pressure liquid flows through the redirection channel 426, out through the outlet channel 35, and out through the outlet opening 33.

In this way, a user can rotate the rotary unit 413 to adjust the size of the clearance between the elongated member 425 and the intake tube 34 to adjust the flow magnitude of the high-pressure liquid. The rotary unit 413 may further be rotated to control the output pressure of the high-pressure liquid.

By the foregoing design, the preferred embodiment of the variable pressure reducing device 2 includes the following advantages:

1) Reduced likelihood of breakage. The variable pressure reducing device 2 uses cooperation between the guide part 421 and the shape of the inner wall surface 311 of the housing body 31 to prevent rotation and guide movement of the guide part 421. In this manner, bending stress on other components and the likelihood of failure due to the bending stress is significantly reduced.

2) Good sealing effect. The high-pressure liquid flows from the intake tube 34, through the redirection channel 426 between the elongated member 425 and the intake tube 34, and out through the outlet channel 35. Leakage between the sleeve tube 424 and the elongated member 425 is blocked by the sealing part 422 to reduce back flow of the high-pressure liquid.

3) Simpler structure. The second section 313 of the housing body 31 and the guide part 421 have corresponding polygonal cross-sections, making it unnecessary to use other parts to prevent rotation of the guide part 421. Moreover, given that the sealing part 422 reduces the back flow problem of the high-pressure fluid, other leakage prevention devices such as washers may be reduced in quantity.

4) Easy to clean. In the preferred embodiment of the invention, the sealing cap 411, the threaded shaft 412, the guide part 421, the sealing part 422, the coupling sleeve 423, the sleeve tube 424 and the elongated member 425 are removable from the end of the housing body 31 to which the sealing cap 411 is mounted. The intake tube 34 may be removed from the end of the housing body 31 having the inlet opening 32. As such, all components may be easily removed, cleaned, and reassembled for reuse, which is convenient and reduces costs.

Elongated may mean having a length to thickness ratio greater than 3:1. High pressure may be greater than one standard atmosphere.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

What is claimed is:

1. A variable pressure reducing device comprising:
   a hollow housing body formed with an inlet opening, an outlet opening spaced apart from said inlet opening, and an inner wall surface;
   an intake tube that extends into said housing body from said inlet opening, said intake tube being formed with an inlet channel and being further formed with an outer tube surface that cooperates with said inner wall surface to form an outlet channel in fluid communication with said outlet opening; and
   a control unit including
      a redirection structure movably mounted in said housing body and movable relative to said intake tube between a redirecting state, in which said redirection structure cooperates with said intake tube to form a redirection channel that permits fluid flow between said inlet channel and said outlet channel, and a sealing state, in which said redirection structure blocks fluid flow between said inlet channel and said outlet channel, and
      a drive unit coupled to and operable to drive movement of said redirection structure between the redirecting state and the sealing state;
   wherein said redirection structure includes a sealing part, a sleeve tube extending from said sealing part, and an elongated member extending from said sealing part and disposed in said sleeve tube,
   said intake tube extending into said sleeve tube,
   said elongated member extending into said intake tube,
   said redirection channel being formed by an outer surface of said elongated member, an inner tube surface of said intake tube, said outer tube surface of said intake tube, and an inner sleeve surface of said sleeve tube,
   said sealing part, said sleeve tube, and said elongated member being movable relative to said intake tube to vary configuration of said redirection channel according to a depth of extension of said intake tube into a space between said sleeve tube and said elongated member.

2. The variable pressure reducing device as claimed in claim 1, wherein said outer surface of said elongated member tapers in a direction away from said sealing part.

3. The variable pressure reducing device as claimed in claim 2, wherein an inner tube surface diameter of said intake tube tapers in a direction away from said sealing part.

4. The variable pressure reducing device as claimed in claim 1, wherein said drive unit is mounted operably to one side of said housing body opposite to said inlet opening and drives movement of said redirection structure along an axis between the redirecting state and the sealing state.

5. The variable pressure reducing device as claimed in claim 4, wherein said redirection structure further includes a guide part that engages slidably and non-rotatably said inner wall surface and that is coupled to said sealing part,
   said drive unit including a rotary unit mounted rotatably to said housing body, and a threaded shaft coupled co-rotatably to said rotary unit and engaging threadedly said guide part such that rotation of said rotary unit relative to said housing body results in co-rotation of said threaded shaft and movement of said guide part along said threaded shaft.

6. The variable pressure reducing device as claimed in claim 5, wherein said redirection structure further includes a coupling sleeve that interconnects said guide part and said sealing part and that is sleeved on said threaded shaft.

7. The variable pressure reducing device as claimed in claim 5, wherein said housing body includes
   a first section formed with said inlet opening and said outlet opening, and having a first inner diameter, and
   a second section connected to said first section and having a second inner diameter greater than said first inner diameter,
   said threaded shaft being disposed in said second section,
   said guide part engaging slidably and non-rotatably said inner wall surface of said housing body in said second section.

8. The variable pressure reducing device as claimed in claim 7, wherein said inner wall surface of said housing body is formed with a polygonal surface in said second section of said housing body, said guide part having a corresponding polygonal surface that engages slidably and non-rotatably said polygonal surface of said inner wall surface in said second section of said housing body.

* * * * *